(12) United States Patent
Mitteregger et al.

(10) Patent No.: US 6,435,857 B1
(45) Date of Patent: Aug. 20, 2002

(54) INJECTION MOULD

(75) Inventors: Erich Mitteregger; Ernst Schwaiger, both of Micheldorf (AT)

(73) Assignee: IFW - Manfred Otte Gesellschaft m.b.H. & Co., KG, Micheldorf (AT)

( * ) Notice: Subject to any disclaimer, the term of this patent is extended or adjusted under 35 U.S.C. 154(b) by 90 days.

(21) Appl. No.: 09/605,980

(22) Filed: Jun. 29, 2000

(30) Foreign Application Priority Data

Jul. 6, 1999 (EP) .............................................. 99113050

(51) Int. Cl.$^7$ ................................................ B29C 45/44
(52) U.S. Cl. ........................ 425/556; 264/334; 425/577; 425/DIG. 58
(58) Field of Search ................................ 425/556, 577, 425/DIG. 58; 264/334

(56) References Cited

U.S. PATENT DOCUMENTS 4,708,632 A * 11/1987 Mitteregger et al. ......... 425/556

FOREIGN PATENT DOCUMENTS

| AT | 366317 | 4/1982 |
| DE | 3444879 | 7/1985 |
| DE | 9414523 | 12/1994 |
| EP | 0027788 | 4/1981 |
| GB | 2145364 | 3/1985 |

* cited by examiner

Primary Examiner—Tim Heitbrink
(74) Attorney, Agent, or Firm—Wenderoth, Lind & Ponack, L.L.P.

(57) ABSTRACT

An injection mould for manufacturing fittings (1) from thermoplastics, which fittings are provided on the inside with at least one annular groove (6), includes a separable outer mould (5) and a mould core (4) which can be pushed into the outer mould (5). A complementary mould bead for forming the annular groove is configured on the mould core (4). The injection mould has a cavity which is formed in the area of the annular groove (6) of the fittings (1) by a plurality of segments (3, 3') that can be assembled together. The outside surface of the portion of the cavity that forms the area of the fitting (1) surrounding the annular groove (6) is partly formed by the separable outer mould (5) and partly by a mould ring (2) connected to the mould core. The separating surface (9) of the mould ring (2) which forms a seam between the mould ring (2) and the outer mould (5), terminating at the fitting (1), has a portion adjacent to the cavity that forms an angle of less than 45° with respect to the longitudinal axis of the mould core (4).

5 Claims, 2 Drawing Sheets

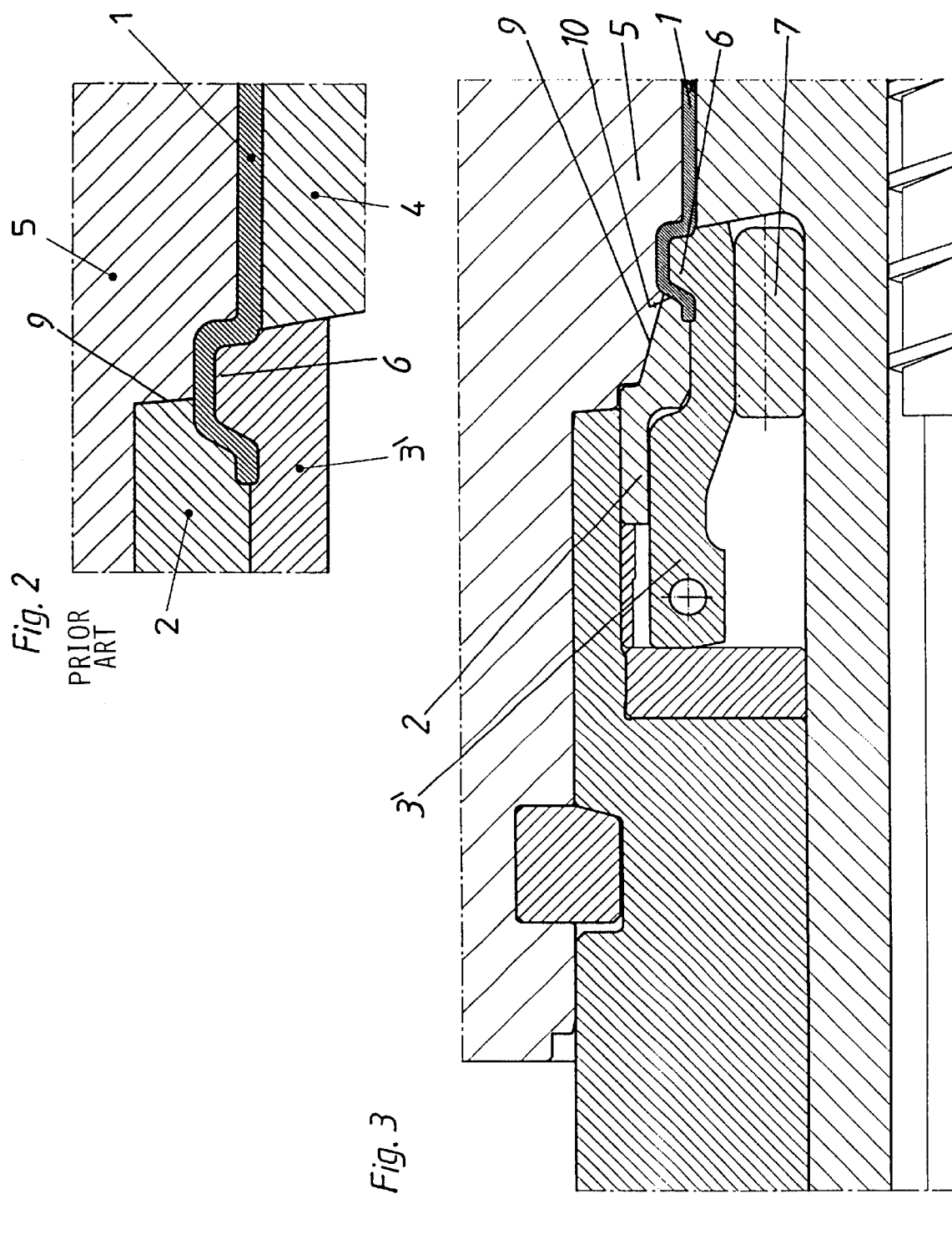

INJECTION MOULD

BACKGROUND OF THE INVENTION

The invention relates to an injection mould for manufacturing fittings from thermoplastics, and which fittings are provided on the inside with at least one annular groove. These injection moulds include a separable outer mould and a mould core which can be pushed into the outer mould. A complementary mould bead for defining the cavity forming the annular groove is configured on the mould core. The injection mould is formed in the area of the annular groove of the fitting by a plurality of segments that can be assembled together, and the outside of the area of the mould cavity which will form the portion of the fitting surrounding the annular groove is partly formed by the separable outer mould and partly by a mould ring connected to the mould core.

An apparatus of this type is described in AT-B 387 750. In this case, the mould ring, seen in the axial direction of the fitting, forms a seam with the separable outer mould that terminates approximately in the center of the area of the cavity surrounding the annular groove of the fitting. When the outer mould closes, it moves along the end face of the mould ring arranged normal to the longitudinal axis of the mould ring. If there is the slightest deviation from the ideal state, this results in either the mould being damaged or a gap being present between the mould ring and the outer mould, into which plastics material may penetrate. In this way, an unsightly web is produced along the outside of the fitting surrounding the annular groove, which is to be avoided.

DE 94 14 523 U describes another type of injection mould apparatus. An advantage of the sustained forcing of the mould ring, however is that the mould ring fixed to the core, shown in the embodiment, is no longer needed for protecting the ring segments. This is correct inasmuch as the sustained forcing in the injection mould of reference DE 94 14 523 U is more functionally reliable than the hydraulic actuation of the segments of the injection mould of reference AT-B 387 750. With omission of the mould ring, however, a segment under sustained forcing can damage the expensive outer mould, if that segment is distorted for any reason.

SUMMARY OF THE INVENTION

The object of the present invention is to avoid the disadvantages of the prior art described above. This object is obtained because the separating surface of the mould ring which abuts the outer mould to form a seam between the mould ring and the outer mould terminates at the cavity for forming the fitting at an angle of less than 45° with respect to the axis of the mould core.

In addition, by arranging the separating surface on the mould ring (which forms the seam between the mould ring and the outer mould) parallel to the axis of the mould core rather than normal to it, the problems with not providing an exact fit between the mould ring and the outer mould cease to apply. If the separating surfaces of the mould ring and outer mould were to meet on the outside surface of the area of the cavity for forming the portion of the fitting surrounding the annular groove, which surface runs parallel to the axis, as was usual according to the prior art, the feature of the invention might cause the mould ring to have a sharp front edge, which would be susceptible to damage. It is therefore preferably provided that the front mould surface of the mould ring adjoining the separating surface, and which form a portion of the outer surface of the cavity for forming the fitting, is inclined at an angle of more than 30°, and preferably at an angle of more than 45°, with respect to the longitudinal axis of the mould core. In practice, this means that the separating surface does not meet the part of the outer surface of the cavity for forming the fitting which runs parallel to the axis of the mould core, but instead meets the inclined part of the outer surface of the cavity which forms a flank of the channel defined by the annular groove. In this way, a pointed front edge on the annular ring is completely avoided.

BRIEF DESCRIPTION OF THE DRAWINGS

The invention will hereinafter by further explained with reference to the drawings, in which:

FIG. 2 is an enlarged section of a part of the apparatus in a configuration according to the prior art; and FIG. 3 is a representation of an analogous section with a configuration according to the invention.

DETAILED DESCRIPTION OF THE INVENTION

Figure 1:
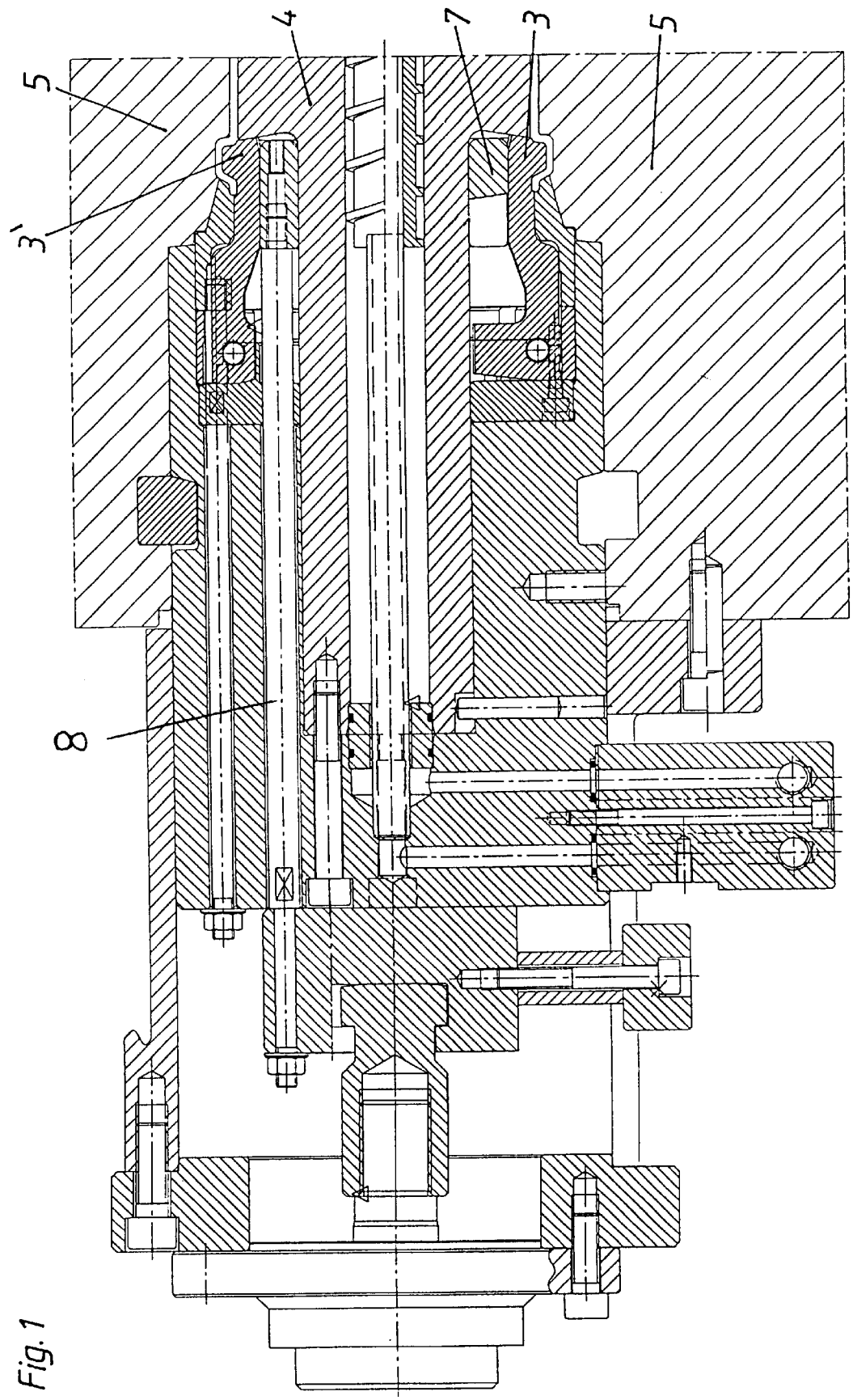
FIG. 1 is a longitudinal section through an embodiment of the invention.

The mould apparatus for the fitting 1 is composed of a mould core and an outer mould. The outside of the fitting 1 is formed on the one hand by the mould halves of the separable outer mould 5, and on the other hand by the removable mould ring 2 along with the mould core 4.

During the injection process, the group of segments 3 and 3', respectively, which form the inner surface of the cavity for forming the annular groove 6 of the fitting 1, are located in the locked position shown in FIG. 1. In this position, they are held by the locking ring 7.

Once the injection process is finished, the two halves of the separable outer mould 5 are moved apart from one another, and the locking ring 7 is withdrawn using one or more draw bars 8. The segments 3 configured as a two-armed lever are thereby pivoted inwards and carry the segments 3' (which support the two armed segments 3) with them. To this extent, the apparatus shown corresponds to the state of the art. The configuration of the joint between the mould ring 2 and the moveable mould core is new, however, as described below.

FIG. 2 shows how the mould ring 2 according to the prior art cooperates with the separable outer mould 5. The separating surface 9 of the mould ring 2 which forms the seam between the mould ring 2 and the outer mould 5 terminates at the outer surface of the cavity that forms the fitting 1. Specifically, the separating surface 9 of the mould ring 2 runs normal to a part of the outer surface of the cavity which forms the portion of the fitting 1 that is parallel to the longitudinal axis of the mould core.

However, the mould ring 2 according to the present invention as shown in FIG. 3 differs substantially from the known mould ring according to FIG. 2. In particular, the separating surface 9 of the mould ring 2 which abuts the outer mould 5 to form a seam between the separable outer mould 5 and the mould ring 2 now no longer runs normal to the longitudinal axis of the mould core 4. Instead, the surface 9 runs approximately parallel to the longitudinal axis of mould core 4. In addition, the front of the mould ring 2 does not form a narrow blade that can to be damaged. This advantage is obtained because the separating surface 9 terminates at the inclined front mould surface 10 of the mould ring 2. This front mould surface forms part of the outer surface of the cavity form forming the fitting 1. In particular, the front mould surface 10 forms the portion of the outer surface of the cavity which will form a flank of the channel in fitting 1 defined by annular groove 6.

As shown in FIG. 3, the separating surface 9 of the mould ring 2 terminates at the front mould surface 10 of the mould ring 2, and is arranged at an angle of less than 45° with respect to the longitudinal axis of the mould core 4. As a result, problems due to misalignment between the mould ring 2 and outer mould 5 are significantly reduced or eliminated. Furthermore, the front mould surface 10 of the mould ring 2 is arranged at an angle of more than 30°, and preferably more than 45°, with respect to the longitudinal axis of the mould core 4. Consequently, a sharp edge (which could be easily damaged) is not formed on the front end of mould ring 2.

What is claimed is:

1. An injection mould having a cavity for forming a fitting from thermoplastics, the fitting having an annular bead around an outer circumference thereof and having an annular groove around an inner circumference thereof, said injection mould comprising:

a separable outer mould;

mould ring operable to slide within said outer mould along a longitudinal axis of said outer mould, said mould ring and said outer mould being adapted to adjoin each other so as to define a portion of a surface of the cavity for forming the annular bead of the fitting, said mould ring having a separating surface for adjoining said outer mould, and said mould ring having a front mould surface to define a portion of the surface of the cavity for forming the annular bead of the fitting; and a mould core operable to slide within said outer mould along the longitudinal axis of said outer mould, said mould core having a plurality of segments profiled to form an inner mould bead to define a portion of the surface of the cavity for forming the annular groove of the fitting;

wherein said front mould surface of said mould ring is inclined at an angle of at least 45 degrees with respect to a longitudinal axis of said mould core, and wherein said separating surface has an end at said front mould surface and extends from said front mould surface at an angle of less than 45 degrees with respect to said longitudinal axis of said mould core.

2. The injection mould of claim 1, wherein said outer mould comprises a pair of mould halves.

3. The injection mould of claim 1, further comprising a locking ring, wherein said plurality of segments comprise at least one two-armed lever segment, said plurality of segments and said locking ring being arranged such that said when said injection mould is in a locked position, said locking ring applies pressure against a first arm of said at least one two-armed lever segment in a radial direction with respect to said mould core, and such that when said injection mould is in a free position, said locking ring applies pressure against a second arm of said at least one two-armed lever segment in an axial direction with respect to said mould core.

4. The injection mould of claim 1, wherein said plurality of said segments are connected to each other.

5. The injection mould of claim 4, wherein said inner mould bead of said mould core comprises a bead portion on each of said plurality of segments.

* * * * *